(12) United States Patent
Kang et al.

(10) Patent No.: US 8,885,751 B2
(45) Date of Patent: Nov. 11, 2014

(54) SIGNAL TRANSMISSION METHOD IN DISTRIBUTED ANTENNA SYSTEM

(75) Inventors: Ji Won Kang, Anyang-si (KR); Bin Chul Ihm, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 56 days.

(21) Appl. No.: 13/579,895

(22) PCT Filed: Feb. 9, 2011

(86) PCT No.: PCT/KR2011/000851

§ 371 (c)(1),
(2), (4) Date: Aug. 17, 2012

(87) PCT Pub. No.: WO2011/102614

PCT Pub. Date: Aug. 25, 2011

(65) Prior Publication Data

US 2012/0314793 A1     Dec. 13, 2012

(30) Foreign Application Priority Data

Feb. 22, 2010 (KR) ........................ 10-2010-0015601

(51) Int. Cl.
*H04B 7/02* (2006.01)
*H04B 7/04* (2006.01)
*H04B 7/06* (2006.01)

(52) U.S. Cl.
CPC ............ *H04B 7/0619* (2013.01); *H04B 7/0456* (2013.01); *H04B 7/024* (2013.01)

USPC ............ 375/267; 375/299; 375/347; 455/101

(58) Field of Classification Search
None
See application file for complete search history.

(56) References Cited

U.S. PATENT DOCUMENTS

| 2004/0013180 | A1 | 1/2004 | Giannakis et al. | |
| 2010/0091678 | A1* | 4/2010 | Chen et al. | 370/252 |
| 2012/0236909 | A1* | 9/2012 | Ma et al. | 375/146 |
| 2012/0275327 | A1* | 11/2012 | Zangi et al. | 370/252 |
| 2013/0242790 | A1* | 9/2013 | Kwon et al. | 370/252 |

FOREIGN PATENT DOCUMENTS

| KR | 10-2003-0055649 | 7/2003 |
| KR | 10-2009-0088086 | 8/2009 |
| WO | 2007/142623 | 12/2007 |

* cited by examiner

*Primary Examiner* — Adolf Dsouza
(74) *Attorney, Agent, or Firm* — Lee, Hong, Degerman, Kang & Waimey

(57) ABSTRACT

The present invention relates to a method for a random terminal to receive a signal from a base station in a distributed antenna system (DAS), and more specifically, to a method for a terminal for receiving a signal from a base station, comprising: selecting a precoding matrix corresponding to a terminal-specific, numbered antenna from a codebook for the DAS, which is based on control information about the terminal-specific antenna to be used for communication with the terminal from among a plurality of antennas which includes antennas that are isolated from each other by a predetermined distance; and processing the received signal by using the selected precoding matrix.

20 Claims, 7 Drawing Sheets

FIG. 2

$$\begin{bmatrix} e^{j\theta_1} & 0 & 0 & 0 & 0 \end{bmatrix}^T \qquad \begin{bmatrix} x_{11}^{2\times 1} & x_{21}^{2\times 1} & 0 & 0 & 0 \end{bmatrix}^T$$

$$\frac{1}{\sqrt{2}}\begin{bmatrix} x_{11}^{2\times 1} & x_{21}^{2\times 1} & e^{j\theta_1} & 0 & 0 \end{bmatrix}^T \qquad \frac{1}{\sqrt{3}}\begin{bmatrix} x_{11}^{2\times 1} & x_{21}^{2\times 1} & e^{j\theta_1} & e^{j\theta_2} & 0 \end{bmatrix}^T$$

$$\frac{1}{\sqrt{2}}\begin{bmatrix} x_{11}^{2\times 1} & x_{21}^{2\times 1} & \hat{x}_{11}^{2\times 1} & \hat{x}_{21}^{2\times 1} & 0 \end{bmatrix}^T \qquad \frac{1}{\sqrt{3}}\begin{bmatrix} x_{11}^{2\times 1} & x_{21}^{2\times 1} & \hat{x}_{11}^{2\times 1} & \hat{x}_{21}^{2\times 1} & e^{j\theta_1} \end{bmatrix}^T$$

$$\frac{1}{\sqrt{2}}\begin{bmatrix} x_{11}^{3\times 1} & x_{21}^{3\times 1} & x_{31}^{3\times 1} & e^{j\theta_1} & 0 \end{bmatrix}^T \qquad \frac{1}{\sqrt{3}}\begin{bmatrix} x_{11}^{3\times 1} & x_{21}^{3\times 1} & x_{31}^{3\times 1} & e^{j\theta_1} & e^{j\theta_2} \end{bmatrix}^T$$

$$\begin{bmatrix} x_{11}^{3\times 1} & x_{21}^{3\times 1} & x_{31}^{3\times 1} & 0 & 0 \end{bmatrix}^T \qquad \frac{1}{\sqrt{2}}\begin{bmatrix} x_{11}^{3\times 1} & x_{21}^{3\times 1} & x_{31}^{3\times 1} & x_{11}^{2\times 1} & x_{21}^{2\times 1} \end{bmatrix}^T$$

$$\begin{bmatrix} x_{11}^{4\times 1} & x_{21}^{4\times 1} & x_{31}^{4\times 1} & x_{41}^{4\times 1} & 0 \end{bmatrix}^T \qquad \frac{1}{\sqrt{2}}\begin{bmatrix} x_{11}^{4\times 1} & x_{21}^{4\times 1} & x_{31}^{4\times 1} & x_{41}^{4\times 1} & e^{j\theta_1} \end{bmatrix}^T$$

FIG. 3

$$\begin{bmatrix} e^{j\theta_1} & 0 \\ 0 & e^{j\theta_2} \\ 0 & 0 \\ 0 & 0 \\ 0 & 0 \end{bmatrix} \begin{bmatrix} x_{11}^{2\times 1} & 0 \\ x_{21}^{2\times 1} & 0 \\ 0 & 0 \\ 0 & 0 \\ 0 & 0 \end{bmatrix} \begin{bmatrix} x_{11}^{2\times 1} & 0 \\ x_{21}^{2\times 1} & 0 \\ 0 & \hat{x}_{11}^{2\times 1} \\ 0 & \hat{x}_{21}^{2\times 1} \\ 0 & 0 \end{bmatrix} \frac{1}{\sqrt{2}} \begin{bmatrix} x_{11}^{2\times 1} & 0 \\ x_{21}^{2\times 1} & 0 \\ e^{j\theta_1} & 0 \\ 0 & \sqrt{2}\hat{x}_{11}^{2\times 1} \\ 0 & \sqrt{2}\hat{x}_{21}^{2\times 1} \end{bmatrix} \frac{1}{\sqrt{2}} \begin{bmatrix} x_{11}^{2\times 1} & 0 \\ x_{21}^{2\times 1} & 0 \\ e^{j\theta_1} & 0 \\ 0 & \sqrt{2}e^{j\theta_2} \\ 0 & 0 \end{bmatrix} \frac{1}{\sqrt{3}} \begin{bmatrix} x_{11}^{2\times 1} & 0 \\ x_{21}^{2\times 1} & 0 \\ e^{j\theta_1} & 0 \\ e^{j\theta_2} & 0 \\ 0 & \sqrt{3}e^{j\theta_3} \end{bmatrix}$$

$$\begin{bmatrix} x_{11}^{2\times 2} & x_{12}^{2\times 2} \\ x_{21}^{2\times 2} & x_{22}^{2\times 2} \\ 0 & 0 \\ 0 & 0 \\ 0 & 0 \end{bmatrix} \frac{1}{\sqrt{2}} \begin{bmatrix} x_{11}^{2\times 2} & \sqrt{2}x_{12}^{2\times 2} \\ x_{21}^{2\times 2} & \sqrt{2}x_{22}^{2\times 2} \\ e^{j\theta_1} & 0 \\ 0 & 0 \\ 0 & 0 \end{bmatrix} \frac{1}{\sqrt{2}} \begin{bmatrix} x_{11}^{2\times 2} & x_{12}^{2\times 2} \\ x_{21}^{2\times 2} & x_{22}^{2\times 2} \\ e^{j\theta_1} & 0 \\ 0 & e^{j\theta_2} \\ 0 & 0 \end{bmatrix} \frac{1}{\sqrt{2}} \begin{bmatrix} x_{11}^{2\times 2} & x_{12}^{2\times 2} \\ x_{21}^{2\times 2} & x_{22}^{2\times 2} \\ \hat{x}_{11}^{2\times 2} & \hat{x}_{12}^{2\times 2} \\ \hat{x}_{21}^{2\times 2} & \hat{x}_{22}^{2\times 2} \\ 0 & 0 \end{bmatrix} \frac{1}{\sqrt{6}} \begin{bmatrix} \sqrt{2}x_{11}^{2\times 2} & \sqrt{3}x_{12}^{2\times 2} \\ \sqrt{2}x_{21}^{2\times 2} & \sqrt{3}x_{22}^{2\times 2} \\ \sqrt{2}\hat{x}_{11}^{2\times 2} & \sqrt{3}\hat{x}_{12}^{2\times 2} \\ \sqrt{2}\hat{x}_{21}^{2\times 2} & \sqrt{3}\hat{x}_{22}^{2\times 2} \\ \sqrt{2}e^{j\theta_1} & 0 \end{bmatrix}$$

$$\frac{1}{\sqrt{3}} \begin{bmatrix} x_{11}^{2\times 2} & \sqrt{3}x_{12}^{2\times 2} \\ x_{21}^{2\times 2} & \sqrt{3}x_{22}^{2\times 2} \\ e^{j\theta_1} & 0 \\ e^{j\theta_2} & 0 \\ 0 & 0 \end{bmatrix} \frac{1}{\sqrt{4}} \begin{bmatrix} x_{11}^{2\times 2} & \sqrt{4}x_{12}^{2\times 2} \\ x_{21}^{2\times 2} & \sqrt{4}x_{22}^{2\times 2} \\ e^{j\theta_1} & 0 \\ e^{j\theta_2} & 0 \\ e^{j\theta_3} & 0 \end{bmatrix} \frac{1}{\sqrt{2}} \begin{bmatrix} x_{11}^{2\times 2} & \sqrt{2}x_{12}^{2\times 2} \\ x_{21}^{2\times 2} & \sqrt{2}x_{22}^{2\times 2} \\ x_{11}^{2\times 1} & 0 \\ x_{21}^{2\times 1} & 0 \\ 0 & 0 \end{bmatrix} \frac{1}{\sqrt{3}} \begin{bmatrix} x_{11}^{2\times 2} & \sqrt{3}x_{12}^{2\times 2} \\ x_{21}^{2\times 2} & \sqrt{3}x_{22}^{2\times 2} \\ x_{11}^{2\times 1} & 0 \\ x_{21}^{2\times 1} & 0 \\ e^{j\theta_1} & 0 \end{bmatrix} \frac{1}{\sqrt{2}} \begin{bmatrix} x_{11}^{2\times 2} & x_{12}^{2\times 2} \\ x_{21}^{2\times 2} & x_{22}^{2\times 2} \\ x_{11}^{2\times 1} & 0 \\ x_{21}^{2\times 1} & 0 \\ 0 & e^{j\theta_1} \end{bmatrix}$$

$$\frac{1}{\sqrt{6}} \begin{bmatrix} \sqrt{2}x_{11}^{2\times 2} & \sqrt{3}x_{12}^{2\times 2} \\ \sqrt{2}x_{21}^{2\times 2} & \sqrt{3}x_{22}^{2\times 2} \\ \sqrt{2}e^{j\theta_1} & 0 \\ \sqrt{2}e^{j\theta_2} & 0 \\ 0 & \sqrt{3}e^{j\theta_3} \end{bmatrix} \begin{bmatrix} x_{11}^{3\times 1} & 0 \\ x_{21}^{3\times 1} & 0 \\ x_{31}^{3\times 1} & 0 \\ 0 & 0 \\ 0 & 0 \end{bmatrix} \begin{bmatrix} x_{11}^{3\times 1} & 0 \\ x_{21}^{3\times 1} & 0 \\ x_{31}^{3\times 1} & 0 \\ 0 & e^{j\theta_1} \\ 0 & 0 \end{bmatrix} \frac{1}{\sqrt{2}} \begin{bmatrix} x_{11}^{3\times 1} & 0 \\ x_{21}^{3\times 1} & 0 \\ x_{31}^{3\times 1} & 0 \\ 0 & x_{11}^{2\times 1} \\ 0 & x_{21}^{2\times 1} \end{bmatrix} \frac{1}{\sqrt{2}} \begin{bmatrix} x_{11}^{3\times 1} & 0 \\ x_{21}^{3\times 1} & 0 \\ x_{31}^{3\times 1} & 0 \\ e^{j\theta_1} & 0 \\ 0 & \sqrt{2}e^{j\theta_2} \end{bmatrix} \frac{1}{\sqrt{2}} \begin{bmatrix} x_{11}^{3\times 1} & 0 \\ x_{21}^{3\times 1} & 0 \\ x_{31}^{3\times 1} & 0 \\ x_{11}^{2\times 2} & \sqrt{2}x_{12}^{2\times 2} \\ x_{21}^{2\times 2} & \sqrt{2}x_{22}^{2\times 2} \end{bmatrix}$$

$$\begin{bmatrix} x_{11}^{3\times 2} & x_{12}^{3\times 2} \\ x_{21}^{3\times 2} & x_{22}^{3\times 2} \\ x_{31}^{3\times 2} & x_{32}^{3\times 2} \\ 0 & 0 \\ 0 & 0 \end{bmatrix} \frac{1}{\sqrt{2}} \begin{bmatrix} x_{11}^{3\times 2} & \sqrt{2}x_{12}^{3\times 2} \\ x_{21}^{3\times 2} & \sqrt{2}x_{22}^{3\times 2} \\ x_{31}^{3\times 2} & \sqrt{2}x_{32}^{3\times 2} \\ e^{j\theta_1} & 0 \\ 0 & 0 \end{bmatrix} \frac{1}{\sqrt{2}} \begin{bmatrix} x_{11}^{3\times 2} & x_{12}^{3\times 2} \\ x_{21}^{3\times 2} & x_{22}^{3\times 2} \\ x_{31}^{3\times 2} & x_{32}^{3\times 2} \\ e^{j\theta_1} & 0 \\ 0 & e^{j\theta_2} \end{bmatrix} \frac{1}{\sqrt{3}} \begin{bmatrix} x_{11}^{3\times 2} & \sqrt{3}x_{12}^{3\times 2} \\ x_{21}^{3\times 2} & \sqrt{3}x_{22}^{3\times 2} \\ x_{31}^{3\times 2} & \sqrt{3}x_{32}^{3\times 2} \\ e^{j\theta_1} & 0 \\ e^{j\theta_2} & 0 \end{bmatrix} \frac{1}{\sqrt{2}} \begin{bmatrix} x_{11}^{3\times 2} & \sqrt{2}x_{12}^{3\times 2} \\ x_{21}^{3\times 2} & \sqrt{2}x_{22}^{3\times 2} \\ x_{31}^{3\times 2} & \sqrt{2}x_{32}^{3\times 2} \\ x_{11}^{2\times 1} & 0 \\ x_{21}^{2\times 1} & 0 \end{bmatrix}$$

$$\frac{1}{\sqrt{2}} \begin{bmatrix} x_{11}^{3\times 2} & \sqrt{2}x_{12}^{3\times 2} \\ x_{21}^{3\times 2} & \sqrt{2}x_{22}^{3\times 2} \\ x_{31}^{3\times 2} & \sqrt{2}x_{32}^{3\times 2} \\ x_{11}^{2\times 1} & 0 \\ x_{21}^{2\times 1} & 0 \end{bmatrix} \frac{1}{\sqrt{2}} \begin{bmatrix} x_{11}^{3\times 2} & x_{12}^{3\times 2} \\ x_{21}^{3\times 2} & x_{22}^{3\times 2} \\ x_{31}^{3\times 2} & x_{32}^{3\times 2} \\ x_{11}^{2\times 2} & x_{12}^{2\times 2} \\ x_{21}^{2\times 2} & x_{22}^{2\times 2} \end{bmatrix} \begin{bmatrix} x_{11}^{4\times 2} & x_{12}^{4\times 2} \\ x_{21}^{4\times 2} & x_{22}^{4\times 2} \\ x_{31}^{4\times 2} & x_{32}^{4\times 2} \\ x_{41}^{4\times 2} & x_{42}^{4\times 2} \\ 0 & 0 \end{bmatrix} \frac{1}{\sqrt{2}} \begin{bmatrix} x_{11}^{4\times 2} & \sqrt{2}x_{12}^{4\times 2} \\ x_{21}^{4\times 2} & \sqrt{2}x_{22}^{4\times 2} \\ x_{31}^{4\times 2} & \sqrt{2}x_{32}^{4\times 2} \\ x_{41}^{4\times 2} & \sqrt{2}x_{42}^{4\times 2} \\ e^{j\theta_1} & 0 \end{bmatrix}$$

FIG. 4

$$\begin{bmatrix} e^{j\theta_1} & 0 & 0 \\ 0 & e^{j\theta_2} & 0 \\ 0 & 0 & e^{j\theta_3} \\ 0 & 0 & 0 \\ 0 & 0 & 0 \end{bmatrix} \begin{bmatrix} x_{11}^{2\times1} & 0 & 0 \\ x_{21}^{2\times1} & 0 & 0 \\ 0 & e^{j\theta_1} & 0 \\ 0 & 0 & e^{j\theta_2} \\ 0 & 0 & 0 \end{bmatrix} \begin{bmatrix} x_{11}^{2\times1} & 0 & 0 \\ x_{21}^{2\times1} & 0 & 0 \\ 0 & \hat{x}_{11}^{2\times1} & 0 \\ 0 & \hat{x}_{11}^{2\times1} & 0 \\ 0 & 0 & e^{j\theta_1} \end{bmatrix} \frac{1}{\sqrt{2}} \begin{bmatrix} x_{11}^{2\times1} & 0 & 0 \\ x_{21}^{2\times1} & 0 & 0 \\ e^{j\theta_1} & 0 & 0 \\ 0 & \sqrt{2}e^{j\theta_2} & 0 \\ 0 & 0 & \sqrt{2}e^{j\theta_3} \end{bmatrix}$$

$$\begin{bmatrix} x_{11}^{2\times2} & x_{12}^{2\times2} & 0 \\ x_{21}^{2\times2} & x_{22}^{2\times2} & 0 \\ 0 & 0 & e^{j\theta_1} \\ 0 & 0 & 0 \\ 0 & 0 & 0 \end{bmatrix} \begin{bmatrix} x_{11}^{2\times2} & x_{12}^{2\times2} & 0 \\ x_{21}^{2\times2} & x_{22}^{2\times2} & 0 \\ 0 & 0 & x_{11}^{2\times1} \\ 0 & 0 & x_{21}^{2\times1} \\ 0 & 0 & 0 \end{bmatrix} \frac{1}{\sqrt{2}} \begin{bmatrix} \sqrt{2}x_{11}^{2\times2} & \sqrt{2}x_{12}^{2\times2} & 0 \\ \sqrt{2}x_{21}^{2\times2} & \sqrt{2}x_{22}^{2\times2} & 0 \\ 0 & 0 & x_{11}^{2\times1} \\ 0 & 0 & x_{21}^{2\times1} \\ 0 & 0 & e^{j\theta_1} \end{bmatrix} \frac{1}{\sqrt{2}} \begin{bmatrix} x_{11}^{2\times2} & \sqrt{2}x_{12}^{2\times2} & 0 \\ x_{21}^{2\times2} & \sqrt{2}x_{22}^{2\times2} & 0 \\ e^{j\theta_1} & 0 & 0 \\ 0 & 0 & \sqrt{2}e^{j\theta_2} \\ 0 & 0 & 0 \end{bmatrix}$$

$$\frac{1}{\sqrt{2}}\begin{bmatrix} x_{11}^{2\times2} & \sqrt{2}x_{12}^{2\times2} & 0 \\ x_{21}^{2\times2} & \sqrt{2}x_{22}^{2\times2} & 0 \\ e^{j\theta_1} & 0 & 0 \\ 0 & 0 & \sqrt{2}x_{11}^{2\times1} \\ 0 & 0 & \sqrt{2}x_{21}^{2\times1} \end{bmatrix} \frac{1}{\sqrt{2}}\begin{bmatrix} x_{11}^{2\times2} & x_{12}^{2\times2} & 0 \\ x_{21}^{2\times2} & x_{22}^{2\times2} & 0 \\ e^{j\theta_1} & 0 & 0 \\ 0 & \hat{x}_{11}^{2\times2} & \sqrt{2}\hat{x}_{12}^{2\times2} \\ 0 & \hat{x}_{21}^{2\times2} & \sqrt{2}\hat{x}_{22}^{2\times2} \end{bmatrix} \frac{1}{\sqrt{2}}\begin{bmatrix} \sqrt{2}x_{11}^{2\times2} & x_{12}^{2\times2} & 0 \\ \sqrt{2}x_{21}^{2\times2} & x_{22}^{2\times2} & 0 \\ 0 & \hat{x}_{11}^{2\times2} & \sqrt{2}\hat{x}_{12}^{2\times2} \\ 0 & \hat{x}_{21}^{2\times2} & \sqrt{2}\hat{x}_{22}^{2\times2} \\ 0 & 0 & 0 \end{bmatrix}$$

$$\frac{1}{\sqrt{3}}\begin{bmatrix} x_{11}^{2\times2} & \sqrt{3}x_{12}^{2\times2} & 0 \\ x_{21}^{2\times2} & \sqrt{3}x_{22}^{2\times2} & 0 \\ e^{j\theta_1} & 0 & 0 \\ e^{j\theta_2} & 0 & 0 \\ 0 & 0 & \sqrt{3}e^{j\theta_3} \end{bmatrix} \frac{1}{\sqrt{2}}\begin{bmatrix} x_{11}^{2\times2} & x_{12}^{2\times2} & 0 \\ x_{21}^{2\times2} & x_{22}^{2\times2} & 0 \\ e^{j\theta_1} & 0 & 0 \\ 0 & e^{j\theta_2} & 0 \\ 0 & 0 & \sqrt{2}e^{j\theta_3} \end{bmatrix} \frac{1}{\sqrt{2}}\begin{bmatrix} x_{11}^{2\times2} & \sqrt{2}x_{12}^{2\times2} & 0 \\ x_{21}^{2\times2} & \sqrt{2}x_{22}^{2\times2} & 0 \\ x_{11}^{2\times1} & 0 & 0 \\ x_{21}^{2\times1} & 0 & 0 \\ 0 & 0 & \sqrt{2}e^{j\theta_1} \end{bmatrix}$$

$$\begin{bmatrix} x_{11}^{3\times1} & 0 & 0 \\ x_{21}^{3\times1} & 0 & 0 \\ x_{31}^{3\times1} & 0 & 0 \\ 0 & e^{j\theta_1} & 0 \\ 0 & 0 & e^{j\theta_2} \end{bmatrix} \begin{bmatrix} x_{11}^{3\times1} & 0 & 0 \\ x_{21}^{3\times1} & 0 & 0 \\ x_{31}^{3\times1} & 0 & 0 \\ 0 & x_{11}^{2\times2} & x_{12}^{2\times2} \\ 0 & x_{21}^{2\times2} & x_{22}^{2\times2} \end{bmatrix} \begin{bmatrix} x_{11}^{3\times2} & x_{12}^{3\times2} & 0 \\ x_{21}^{3\times2} & x_{22}^{3\times2} & 0 \\ x_{31}^{3\times2} & x_{32}^{3\times2} & 0 \\ 0 & 0 & e^{j\theta_1} \\ 0 & 0 & 0 \end{bmatrix} \begin{bmatrix} x_{11}^{3\times2} & x_{12}^{3\times2} & 0 \\ x_{21}^{3\times2} & x_{22}^{3\times2} & 0 \\ x_{31}^{3\times2} & x_{32}^{3\times2} & 0 \\ 0 & 0 & x_{11}^{2\times1} \\ 0 & 0 & x_{21}^{2\times1} \end{bmatrix}$$

$$\frac{1}{\sqrt{2}}\begin{bmatrix} x_{11}^{3\times2} & \sqrt{2}x_{12}^{3\times2} & 0 \\ x_{21}^{3\times2} & \sqrt{2}x_{22}^{3\times2} & 0 \\ x_{31}^{3\times2} & \sqrt{2}x_{32}^{3\times2} & 0 \\ e^{j\theta_1} & 0 & 0 \\ 0 & 0 & \sqrt{2}e^{j\theta_2} \end{bmatrix} \frac{1}{\sqrt{2}}\begin{bmatrix} \sqrt{2}x_{11}^{3\times2} & x_{12}^{3\times2} & 0 \\ \sqrt{2}x_{21}^{3\times2} & x_{22}^{3\times2} & 0 \\ \sqrt{2}x_{31}^{3\times2} & x_{32}^{3\times2} & 0 \\ 0 & x_{11}^{2\times2} & \sqrt{2}x_{12}^{2\times2} \\ 0 & x_{21}^{2\times2} & \sqrt{2}x_{22}^{2\times2} \end{bmatrix} \begin{bmatrix} x_{11}^{3\times3} & x_{12}^{3\times3} & x_{13}^{3\times3} \\ x_{21}^{3\times3} & x_{22}^{3\times3} & x_{23}^{3\times3} \\ x_{31}^{3\times3} & x_{32}^{3\times3} & x_{33}^{3\times3} \\ 0 & 0 & 0 \\ 0 & 0 & 0 \end{bmatrix}$$

$$\frac{1}{\sqrt{2}}\begin{bmatrix} \sqrt{2}x_{11}^{3\times3} & \sqrt{2}x_{12}^{3\times3} & x_{13}^{3\times3} \\ \sqrt{2}x_{21}^{3\times3} & \sqrt{2}x_{22}^{3\times3} & x_{23}^{3\times3} \\ \sqrt{2}x_{31}^{3\times3} & \sqrt{2}x_{32}^{3\times3} & x_{33}^{3\times3} \\ 0 & 0 & e^{j\theta_1} \\ 0 & 0 & 0 \end{bmatrix} \frac{1}{\sqrt{2}}\begin{bmatrix} x_{11}^{3\times3} & \sqrt{2}x_{12}^{3\times3} & x_{13}^{3\times3} \\ x_{21}^{3\times3} & \sqrt{2}x_{22}^{3\times3} & x_{23}^{3\times3} \\ x_{31}^{3\times3} & \sqrt{2}x_{32}^{3\times3} & x_{33}^{3\times3} \\ 0 & 0 & e^{j\theta_1} \\ e^{j\theta_2} & 0 & 0 \end{bmatrix} \frac{1}{\sqrt{3}}\begin{bmatrix} \sqrt{3}x_{11}^{3\times3} & \sqrt{3}x_{12}^{3\times3} & x_{13}^{3\times3} \\ \sqrt{3}x_{21}^{3\times3} & \sqrt{3}x_{22}^{3\times3} & x_{23}^{3\times3} \\ \sqrt{3}x_{31}^{3\times3} & \sqrt{3}x_{32}^{3\times3} & x_{33}^{3\times3} \\ 0 & 0 & e^{j\theta_1} \\ 0 & 0 & e^{j\theta_2} \end{bmatrix}$$

$$\frac{1}{\sqrt{2}}\begin{bmatrix} \sqrt{2}x_{11}^{3\times3} & \sqrt{2}x_{12}^{3\times3} & x_{13}^{3\times3} \\ \sqrt{2}x_{21}^{3\times3} & \sqrt{2}x_{22}^{3\times3} & x_{23}^{3\times3} \\ \sqrt{2}x_{31}^{3\times3} & \sqrt{2}x_{32}^{3\times3} & x_{33}^{3\times3} \\ 0 & 0 & x_{11}^{2\times1} \\ 0 & 0 & x_{21}^{2\times1} \end{bmatrix} \begin{bmatrix} x_{11}^{4\times3} & x_{12}^{4\times3} & x_{13}^{4\times3} \\ x_{21}^{4\times3} & x_{22}^{4\times3} & x_{23}^{4\times3} \\ x_{31}^{4\times3} & x_{32}^{4\times3} & x_{33}^{4\times3} \\ x_{41}^{4\times3} & x_{42}^{4\times3} & x_{43}^{4\times3} \\ 0 & 0 & 0 \end{bmatrix} \frac{1}{\sqrt{2}}\begin{bmatrix} x_{11}^{4\times3} & \sqrt{2}x_{12}^{4\times3} & \sqrt{2}x_{13}^{4\times3} \\ x_{21}^{4\times3} & \sqrt{2}x_{22}^{4\times3} & \sqrt{2}x_{23}^{4\times3} \\ x_{31}^{4\times3} & \sqrt{2}x_{32}^{4\times3} & \sqrt{2}x_{33}^{4\times3} \\ x_{41}^{4\times3} & \sqrt{2}x_{42}^{4\times3} & \sqrt{2}x_{43}^{4\times3} \\ e^{j\theta_1} & 0 & 0 \end{bmatrix}$$

SIGNAL TRANSMISSION METHOD IN DISTRIBUTED ANTENNA SYSTEM

CROSS-REFERENCE TO RELATED APPLICATIONS

This application is the National Stage filing under 35 U.S.C. 371 of International Application No. PCT/KR2011/000851, filed on Feb. 9, 2011, which claims the benefit of earlier filing date and right of priority to Korean Application No. 10-2010-0015601, filed on Feb. 22, 2010, the contents of which are all incorporated by reference herein in their entirety.

TECHNICAL FIELD

The present invention relates to a Distributed Antenna System (DAS), and more particularly, to a method and apparatus for transmitting a signal in a DAS.

BACKGROUND ART

Owing to the development of the information industry, techniques for transmitting a large amount of data of various types at high rates are required. In this context, a DAS is under study to eliminate shadowing areas and extend coverage by distributing a plurality of antennas across an existing cell.

The DAS is a system that uses a plurality of distributed antennas connected to a single Base Station (BS) by cable or by a dedicated line. The single BS manages the antennas distributed at various positions in the cell. The DAS is different from a Centralized Antenna System (CAS) having a plurality of BS antennas at the center of a cell, in that a plurality of antennas are distributed across a cell. The DAS system is also different from a femto cell in that the BS at the center of the cell manages all distributed antenna areas within the cell, rather than each individual distributed antenna unit manages its antenna area. Compared to a multi-hop relay system in which a BS is connected wirelessly to a Remote Station (RS), or an ad-hoc network, the distributed antenna units are connected to the BS by cable or a dedicated line in the DAS. While a repeater is configured so as to simply amplify a signal and transmit the amplified signal, each distributed antenna can transmit a different signal in response to a command from the BS in the DAS.

Considering that distributed antennas can support a single or multiple Mobile Stations (MSs) by transmitting and receiving different data streams at the same time, the DAS may be regarded as a kind of Multiple Input Multiple Output (MIMO) system. From the standpoint of the MIMO system, the DAS can reduce transmission power because each of antennas distributed across a cell has a smaller transmission area than in the CAS. The reduction of path loss attributed to a shorter transmission distance between an antenna and an MS enables high-speed data transmission, thereby increasing the transmission capacity and power efficiency of a cellular system and keeping communication performance uniform irrespective of the location of a user in the cell, relative to the CAS. Furthermore, as a plurality of distributed antennas are connected to a BS by cable or a dedicated line, signal loss is small and the correlation and interference between antennas are decreased. As a consequence, high Signal to Interference plus Noise Ratio (SINR) can be achieved.

As described above, the DAS may be a new foundation for cellular communication, substituting for the conventional CAS because it can reduce BS installation cost and backhaul maintenance cost, extend service coverage, and increase SINR in a future-generation mobile communication system.

Accordingly, there exists a need for supporting the DAS as well as the CAS with CAS-based communication standards in a conventional mobile communication system.

DISCLOSURE

Technical Problem

An object of the present invention devised to solve the conventional problem is to provide a method for constructing a DAS codebook using a conventional codebook, for use in a DAS and conducting wireless communication using a precoding matrix selected from the DAS codebook.

Another object of the present invention is to provide a method for selecting the best precoding matrix by sharing information about a UE-specific antenna for communication with a UE from among a plurality of antennas included in a BS with the UE and conducting wireless communication using the selected precoding matrix.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for receiving a signal from a BS at a UE in a DAS includes receiving, from the BS having a plurality of antennas spaced from one another by a predetermined distance or more, control information about the number of UE-specific antennas selected from among the plurality of antennas, for use in communication with the UE, receiving a signal from the BS, and processing the received signal using a precoding matrix corresponding to the number of UE-specific antennas, selected from a DAS codebook. The control information is received on a dedicated control channel.

The control information may be independent for each UE in the DAS. The control information may be determined and changed according to at least one of the location of the UE and a frequency band used by the UE. In addition, the control information may be determined the using an uplink signal received from the UE by the BS.

The receiving the control information may include transmitting feedback information to the BS, the feedback information being determined using a downlink signal received from the BS, and receiving the control information about the number of UE-specific antennas from the BS, the control information about the number of UE-specific antennas being determined referring to the feedback information received from the UE by the BS.

The DAS codebook may include precoding matrices corresponding to N antennas, where the N is one of 3, 5, 6, 7, 9, and more. The precoding matrix for the N antennas may include a precoding matrix for M (M<N) antennas as an element. The DAS codebook may include precoding matrices configured to allocate different transmission power to each antenna.

In another aspect of the present invention, a method for transmitting a signal to a UE at a BS in a DAS includes transmitting to the UE control information about the number of UE-specific antennas selected from among a plurality of antennas spaced from one another by a predetermined distance or more in the BS, for use in communication with the UE, selecting a precoding matrix corresponding to the number of UE-specific antennas from a DAS codebook, and transmitting a signal using the selected precoding matrix to the UE. The control information is transmitted on a dedicated control channel.

The transmitting control information may include receiving feedback information from the UE, the feedback information being determined using a downlink signal received from the BS by the UE, and transmitting the control information about the number of UE-specific antennas to the UE, the control information about the number of UE-specific antennas being determined referring to the feedback information received from the UE by the BS.

In another aspect of the present invention, a UE in a DAS includes a reception module for receiving, from a BS having a plurality of antennas spaced from one another by a predetermined distance or more, control information about the number of UE-specific antennas selected from among the plurality of antennas, for use in communication with the UE, and receiving a signal from the BS, a memory for storing a DAS codebook, and a processor for selecting a precoding matrix corresponding to the number of UE-specific antennas from the DAS codebook and processing the signal received through the reception module using the selected precoding matrix. The control information is received on a dedicated control channel.

The UE may further include a transmission module for transmitting a signal. When the processor determines feedback information using a downlink signal received from the BS through the reception module and transmits the feedback information to the BS through the transmission module, the processor may receive the control information about the number of UE-specific antennas from the BS through the reception module, the control information about the number of UE-specific antennas being determined referring to the feedback information received from the UE by the BS.

In a further aspect of the present invention, a BS in a DAS includes a memory for storing a DAS codebook, a processor for determining control information about the number of UE-specific antennas selected from among a plurality of antennas spaced from one another by a predetermined distance or more in the BS, for use in communication with the UE, and selecting a precoding matrix corresponding to the number of UE-specific antennas from the DAS codebook, and a transmission module for transmitting a signal using the selected precoding matrix to a UE belonging to the DAS. The control information is transmitted on a dedicated control channel.

The processor may determine the control information according to at least one of the location of the UE and a frequency band used by the UE.

The BS may further include a reception module for receiving a signal and the processor may determine the control information about the number of UE-specific antennas using an uplink signal received from the UE.

When the processor receives feedback information from the UE through the reception module, the feedback information being determined using a downlink signal received from the BS by the UE, the processor may determine the control information about the number of UE-specific antennas referring to the feedback information.

The embodiments of the present invention are merely a part of preferred embodiments of the present invention and those skilled in the art can derive and understand various embodiments reflecting the technical features of the present invention from the detailed description of the present invention.

Advantageous Effects

According to the embodiments of the present invention, a DAS codebook can be constructed using a conventional code book, for use in various manners according to signaling and signals can be transmitted and received using the DAS codebook.

According to the embodiments of the present invention, the best precoding matrix can be selected for signal transmission and reception by sharing information about a predetermined number of antennas used for communication with a specific UE and information about the power allocation ratio of each antenna between a BS and the specific UE.

According to the embodiments of the present invention, interference with other UEs can be minimized by controlling the power allocation ratios of a predetermined number of antennas used for communication with a specific UE.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 2 illustrates an exemplary set of precoding matrices for the DAS according to an embodiment of the present invention;

FIG. 3 illustrates another exemplary set of precoding matrices for the DAS according to the embodiment of the present invention;

FIG. 4 illustrates a further exemplary set of precoding matrices for the DAS according to the embodiment of the present invention;

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a 3$^{rd}$ Generation Partnership Project Long Term Evolution (3GPP LTE) system is being used. However, the description is applicable to any other wireless communication system except for specific features inherent to the 3GPP LTE system.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), etc. In addition, the term Base Station (BS) generically refers to any node at a network end which communicates with a UE, such as a Node B, an evolved Node B (eNode B), etc.

A Distributed Antenna System (DAS), which is characterized by distribution of a plurality of antennas connected to a single BS by cable across a cell, may be implemented in various configurations according to the number and positions of antennas. For example, a plurality of antennas may be distributed equidistantly across a cell or two or more antennas may be densely located in a specific place. The DAS can transmit signals with a rank of 2 or higher if antennas are overlapped in coverage, irrespective of how antennas are distributed across a cell. The term rank refers to a number of data streams that can be transmitted through one or more antennas.

Figure 1:
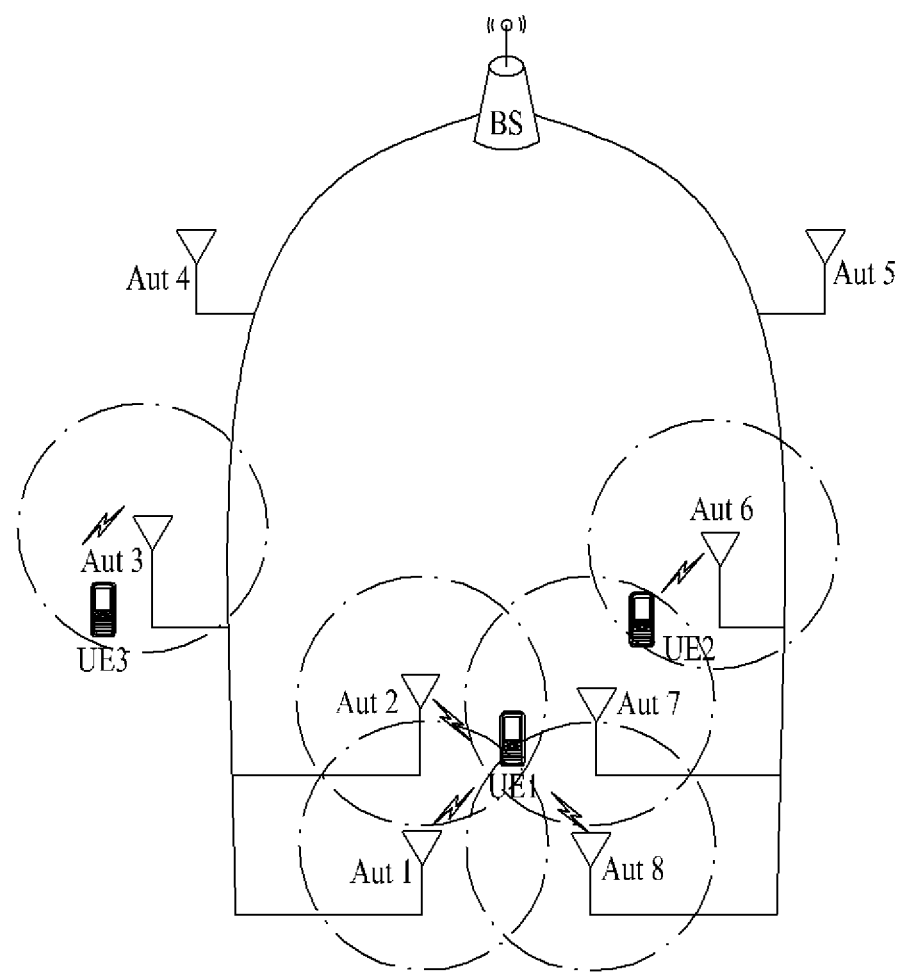
FIG. 1 illustrates an exemplary configuration of a Distributed Antenna System (DAS) to which the present invention is applied.

FIG. 1 illustrates an exemplary DAS configuration to which the present invention is applied.

Referring to FIG. 1, a single BS may be connected to a total of eight antennas by cable in a cell. The antennas may be distributed equidistantly or randomly across the cell. In the DAS, there is no need for using all of the antennas connected to the BS. Rather, an appropriate number of antennas may be used for a UE according to the signal transmission range of each antenna, coverage overlap and interference with adjacent antennas, and the distance between an antenna and the UE (i.e. a user). For example, in the case where there are three UEs within a cell and UE 1 is located within the signal transmission ranges of antennas 1, 2, 7 and 8 as illustrated in FIG. 1, UE 1 may receive signals from BS antennas 1, 2, 7 and 8. From the standpoint of UE 1, antennas 3, 4, 5 and 6 are highly likely to cause large path loss and increase power consumption because they are far from UE 1. Therefore, signals from antennas 3, 4, 5 and 6 may be negligibly weak. In another example, UE 2 is located in an area where the signal transmission ranges of antennas 6 and 7 are overlapped. Therefore, signals from antennas other than antennas 6 and 7 are negligibly weak for UE 2. UE 3 is near to antenna 3 and thus can receive a signal from antenna 3 exclusively.

As illustrated in FIG. 1, when a plurality of antennas are spaced from one another in a cell, the DAS operates like a Multiple Input Multiple Output (MIMO) system. The BS can communicate with UE 1 through antenna group 1 including antennas 1, 2, 7 and 8, with UE 2 through antenna group 2 including antennas 6 and 7, and with UE 3 through antenna 3, at the same time. Antennas 4 and 5 may be used for transmission to UE 3 and UE 2, respectively or may be turned off.

That is, the DAS may be configured in such a manner that the number of data streams transmitted to each UE can be varied and various antennas or antenna groups can be allocated to each UE in a cell serviced by a BS, for Single User/Multi-User (SU/MU) MIMO communication. While an antenna or antenna group may be preset for communication with a UE according to the location of the UE in the cell, it can be changed adaptively according to movement of the UE in the cell.

Since part of antennas or antenna groups connected to the BS by cable are used for communication with a specific UE in the DAS as illustrated in FIG. 1, a DAS precoding matrix is needed for signal transmission and reception between the BS and the UE.

In accordance with an embodiment of the present invention, the size of a DAS precoding matrix is determined according to the number of data streams (or a rank) transmitted to a specific UE with respect to a total number of BS antennas, $N_{tx}$. The total number of BS antennas, $N_{tx}$ is defined as all antennas connected to the BS or a maximum number of antennas that can be searched for by the UE. An exemplary method for generating a DAS codebook according to an embodiment of the present invention is based on the assumption that a plurality of UEs located in a cell serviced by a BS knows the total number of antennas in the BS, $N_{tx}$ through a broadcast channel such as a Physical Broadcast Channel (PBCH) in LTE/LTE-Advanced (LTE-A) and a SuperFrame Header (SFH) in Institute of Electrical and Electronics Engineers (IEEE) 802.16.

In accordance with an embodiment of the present invention, a DAS precoding matrix may be constructed to be an antenna selective precoding matrix including information about antennas used for communication with a specific UE among the entire BS antennas. An antenna selective precoding matrix has 0s as the elements of a specific row or column. Rows or columns corresponding to the remaining antennas except for the antennas used for communication with the specific UE among the entire antennas available to the BS are set to 0s. If a precoder is configured with an antenna selective precoding matrix, a specific antenna or antenna group selected from among available antennas can be used for a specific UE.

The DAS precoding matrix may be constructed using a precoding matrix randomly selected from a conventional Centralized Antenna System (CAS) codebook in the embodiment of the present invention. A base precoding matrix may be constructed to build a DAS codebook for the number of antennas equal to or larger than a predetermined criterion including the total number of BS antennas ($N_{tx}$=1).

In the DAS, the number of effective antennas that each of a plurality of UEs wirelessly communicating with a BS can search for may be varied in real time. In general, the number of effective antennas may be other than 1, 2, 4, or 8 used for MIMO. Accordingly, a DAS codebook preferably includes precoding matrices for $N_{tx}$=3, 5, 6, and 7 and $N_{tx}$>8 as well as for the general cases of $N_{tx}$=1, 2, 4, and 8 in the embodiment of the present invention.

Now, a description will be given of a procedure for constructing DAS precoding matrices according to an embodiment of the present invention.

Step 1) A first sub-precoding matrix is positioned at the leftmost top of an empty matrix in order to construct a base precoding matrix according to an embodiment of the present invention. The base precoding matrix is the first DAS precoding matrix that an operator freely designs to construct a DAS codebook. Various base precoding matrices may be generated according to the total number of antennas and a rank. A precoding matrix smaller than the base precoding matrix may be selected as the first sub-precoding matrix, from any codebook such as a codebook designed in conformance to CAS communication standards or a DAS codebook.

Elements of the matrix to the right of the first sub-precoding matrix are set to 0s. For example, when an $N_{tx} \times r$ precoding matrix is constructed ($N_{tx}$ is the total number of antennas and r is a rank), an $N'_{tx} \times r'$ precoding matrix may be placed in element (1, 1) of the matrix. Herein, $N'_{tx}$ is the number of base antennas smaller than $N_{tx}$ ($N'_{tx} < N_{tx}$) and r' is equal to or smaller than the rank r ($r' \leq r$). If $r' < r$, columns to the right of the $N'_{tx} \times r'$ precoding matrix, that is, all elements in the first to $N'_{tx}{}^{th}$ rows and $(r'+1)^{th}$ to $r^{th}$ columns are set to 0s.

Step 2) The remaining rows under the first sub-precoding matrix are filled with 0s or a second sub-precoding matrix. In the embodiment described in 1), the elements of $N_{tx} - N'_{tx}$ rows are all set to 0s or the second sub-precoding matrix is placed in any $k^{th}$ column of an $(N'_{tx}+1)^{th}$ row, while 0s are set in the other elements. That is, an $N''_{tx} \times r''$ precoding matrix may be randomly selected as the second sub-precoding matrix from the codebook. Herein, $N''_{tx}$ is the number of base antennas equal to or smaller than $(N_{tx} - N'_{tx})$ and r'' is a rank equal to or smaller than (r−k+1), for the right side of the first sub-precoding matrix.

When a sub-precoding matrix is placed in the base precoding matrix, at least one sub-precoding matrix is included in all rows of the base precoding matrix and the remaining elements except for the sub-precoding matrix are set to 0s. Accordingly, the number of sub-precoding matrices for each row of the base precoding matrix is 1 or 0. In accordance with the embodiment of the present invention, since the remaining elements except for a sub-precoding matrix in a base precoding matrix are set to 0s, orthogonality can be maintained between columns.

Step 3) After $N'_{tx} \leftarrow N'_{tx} + N''_{tx}$, step 2) may be repeated to thereby generate a plurality of DAS precoding matrices in the above embodiment of the present invention. When a DAS codebook is configured to include the generated DAS precoding matrices, a matric with all 0s in any row is preferably excluded from the final DAS precoding matrices. To maintain the energy of each column in the final precoding matrices to be 1, all elements of the column may be divided by the square root of the number of precoding matrices filled in the column.

Since a codebook generally also includes the transpose matrices of precoding matrices, which are configured by exchanging the positions of the columns and rows of the precoding matrices, various precoding matrices can further be generated by permuting the order of the rows and/or columns of one base precoding matrix.

Step 4) The precoding matrices generated in the above step may include information about antennas used for communication between a BS and a specific UE. Power may be unequally distributed to the selected individual antennas based on channel state and the distances between the antennas and the BS. That is, matrix coefficients corresponding to individual antennas in a precoding matrix provide information about power ratios allocated to the respective antennas in the embodiment of the present invention.

For example, the BS may transmit the same signal to UE 1 through distributed antennas 6 and 7 in FIG. 1. For $N_{tx}=2$ and rank=1, if antenna 6 is farther from UE 2 than antenna 7, a precoding matrix $[\sqrt{0.5} \ \sqrt{0.5}e^{j\theta}]^T$ ($\theta$ is a phase) may be changed to $[\sqrt{0.8} \ \sqrt{0.2}e^{j\theta}]^T$ by setting unequal matrix coefficients. The BS adjusts the power allocation ratios of antennas 6 and 7 used for signal transmission to UE 2 to precoding vector coefficient ratios, thereby increasing the performance of each antenna. As a result, overall system performance may be increased, taking into account interference with other UEs, as well as the performance of a target UE to which the BS is to transmit a signal can be increased.

However, if only a precoding matrix with equal coefficients in all elements is to be used in the system, a DAS codebook may be constructed by excluding power control-type precoding matrices. In this case, information about a power ratio allocated to each antenna may be shared between a BS and a UE by additional signaling.

For example, for $N_{tx}=3$, base precoding matrices may be constructed using precoding matrices designed for $N_{tx}=1$ and $N_{tx}=2$ by performing the above-described steps in the embodiment of the present invention. Exemplary base precoding matrices for $N_{tx}=3$ and rank=1 may be given as $$[x_{11}^{2\times 1} \ x_{21}^{2\times 1} \ 0]^T, \ [e^{j\theta_1} \ 0 \ 0]^T, \ \frac{1}{\sqrt{2}}[x_{11}^{2\times 1} \ x_{21}^{2\times 1} \ e^{j\theta_1}]^T \qquad \text{Equation 1}$$

In Equation 1, $\theta_i$ (i is a positive integer) is any phase and it is assumed that a vector in the form of $$\frac{1}{\sqrt{N}}[e^{j\theta_1} \ \ldots \ e^{j\theta_N}]^T$$

(N is an integer) is included in a precoding vector $[x_{11}^{N\times 1} \ \ldots \ x_{N1}^{N\times 1}]^T$. These two features are applied to other embodiments of the present invention which will be described later. Precoding matrices for $N_{tx}=3$ and rank=1 include precoding matrices obtained by row-permutation of the base precoding matrices given as Equation 1.

In the 3×1 matrix $$\frac{1}{\sqrt{2}}[x_{11}^{2\times 1} \ x_{21}^{2\times 1} \ e^{j\theta_1}]^T$$

among the precoding matrices given as Equation 1 in the embodiment of the present invention, the power ratios of the first and second elements are summed to 0.5 and the energy of the third element is 0.5. This means that the sum of power allocated to the first and second antennas used for communication with a UE is equal to power allocated to the third antenna used for communication with the UE. Because an average path loss from each antenna BS unit is different according to the position of a UE in the DAS, a power control-type precoder that allocates power to different antennas at different ratios may be configured.

In accordance with the embodiment of the present invention, exemplary base precoding matrices for $N_{tx}=3$ and rank=2 may be constructed as $$\begin{bmatrix} x_{11}^{2\times 2} & x_{12}^{2\times 2} \\ x_{21}^{2\times 2} & x_{22}^{2\times 2} \\ 0 & 0 \end{bmatrix}, \begin{bmatrix} e^{j\theta_1} & 0 \\ 0 & e^{j\theta_2} \\ 0 & 0 \end{bmatrix}, \qquad \text{Equation 2}$$

$$\frac{1}{\sqrt{2}} \begin{bmatrix} x_{11}^{2\times2} & \sqrt{2}\,x_{12}^{2\times2} \\ x_{21}^{2\times2} & \sqrt{2}\,x_{22}^{2\times2} \\ e^{j\theta_1} & 0 \end{bmatrix}, \begin{bmatrix} x_{11}^{2\times1} & 0 \\ x_{21}^{2\times1} & 0 \\ 0 & e^{j\theta_1} \end{bmatrix}$$

Likewise, precoding matrices for $N_{tx}=3$ and rank=2 may include precoding matrices obtained by row-permutation and column-permutation of the precoding matrices given as Equation 2.

In the embodiment of the present invention, exemplary base precoding matrices for $N_{tx}=3$ and rank=3 may be constructed as $$\begin{bmatrix} e^{j\theta_1} & 0 & 0 \\ 0 & e^{j\theta_2} & 0 \\ 0 & 0 & e^{j\theta_3} \end{bmatrix}, \begin{bmatrix} x_{11}^{2\times2} & x_{12}^{2\times2} & 0 \\ x_{21}^{2\times2} & x_{22}^{2\times2} & 0 \\ 0 & 0 & e^{j\theta_1} \end{bmatrix} \qquad \text{Equation 3}$$

Likewise, precoding matrices for $N_{tx}=3$ and rank=3 may include precoding matrices obtained by row-permutation and column-permutation of the precoding matrices given as Equation 3.

Once a DAS base precoding matrix for $N_{tx}=3$ and a given rank is generated by Equation 1, Equation 2 or Equation 3 and precoding matrices are derived from the base precoding matrix, precoding matrices for a larger number of antennas than the number of antennas corresponding to the generated precoding matrices may be constructed.

For example, precoding matrices for $N_{tx}=5$ generated using precoding matrices for $N_{tx}=3$ generated by Equation 1, Equation 2 and Equation 3 will be described with reference to FIGS. 2, 3 and 4.

FIGS. 2, 3 and 4 illustrate embodiments of a set of precoding matrices designed for the DAS according to the embodiment of the present invention.

FIG. 2 illustrates exemplary base precoding matrices for $N_{tx}=5$ and rank=1 according to an embodiment of the present invention. A set of precoding matrices for $N_{tx}=5$ and rank=1 may include precoding matrices obtained by row-permutation of the base precoding matrices illustrated in FIG. 2.

FIG. 3 illustrates exemplary base precoding matrices for $N_{tx}=5$ and rank=2 according to an embodiment of the present invention.

Referring to FIG. 3, $x_{ij}^{N_{tx}\times r}$ denotes an element (i, j) of a base precoding matrix of size $N_{tx}\mathrm{x}r$ where $N_{tx}$ is the total number of antennas and r is a rank, according to the embodiment of the present invention. $\hat{x}_{ij}^{N_{tx}\times r}$ denotes an element (i, j) of an independent precoding matrix of the same size as the base precoding matrix, randomly selected from a codebook. These two precoding matrices are randomly, independently selected and they may be the same or different. Likewise, a set of precoding matrices for $N_{tx}=5$ and r=2 may include precoding matrices obtained by row-permutation and column-permutation of the base precoding matrices illustrated in FIG. 3.

FIG. 4 illustrates exemplary base precoding matrices for $N_{tx}=5$ and r=3 according to an embodiment of the present invention. A set of precoding matrices for $N_{tx}=5$ and r=3 may also include precoding matrices obtained by row-permutation and column-permutation of the base precoding matrices illustrated in FIG. 4.

While FIGS. 2, 3 and 4 illustrate examples of precoding matrices that can be constructed for $N_{tx}=5$ and r=1, 2, and 3, precoding matrices for r=4 and 5 may be constructed using precoding matrices for $N_{tx}<5$ as sub-precoding matrices.

When DAS precoding matrices are created in this manner, precoding matrices may be generated for 3, 5, 6, 7, and more than 8 antennas as well as for 1, 2, 4 or 8 antennas.

While a DAS codebook according to an embodiment of the present invention may include antenna selective precoding matrices generated in the above manner, only necessary matrices may be included in the DAS codebook depending on system configurations. For example, the size of the set of precoding matrices designed for $N_{tx}=5$ and r=2 may be reduced by excluding antenna selective precoding matrices with all 0s in a specific row or column corresponding to an unused antenna in FIG. 3.

Or, the effect of precoding matrices obtained by row permutation and/or column permutation of a base precoding matrix may be achieved by changing the order of BS antennas or the mapping order of data streams in configuring a precoder. Accordingly, if a mapping order is signaled when a precoder is configured, a DAS codebook may be made only with a base precoding matrix.

In a method for transmitting and receiving signals between a BS and a UE according to an embodiment of the present invention, the best DAS precoding matrix is selected from a DAS codebook generated in the above embodiment of the present invention, using UE-specific antenna information shared between a BS and a UE, and signals are transmitted and received using the selected DAS precoding matrix.

Figure 5:
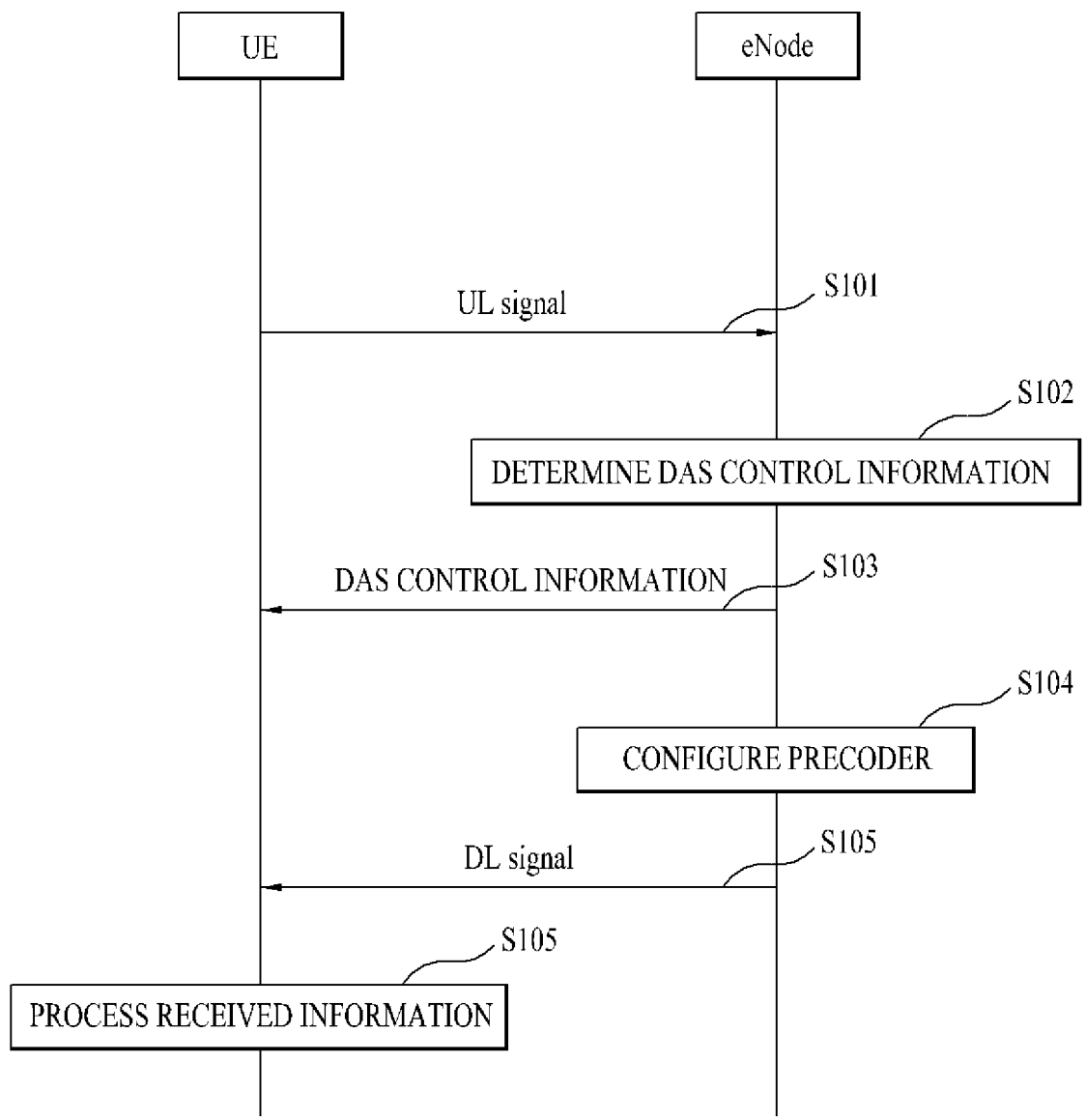
FIG. 5 is a diagram illustrating a signal flow for an exemplary operation for transmitting a signal using a precoding matrix in the DAS according to an embodiment of the present invention.

FIG. 5 is a diagram illustrating a signal flow for an exemplary operation for transmitting a signal using a precoding matrix in the DAS according to an embodiment of the present invention.

Referring to FIG. 5, an eNode B according to an embodiment of the present invention receives an uplink signal from a UE, such as data, a pilot signal, feedback information, an ACKnowledgment/Negative ACKnowledgment (ACK/NACK) signal indicating whether data has been received successfully, etc. (S101). Then the eNode B selects effective antennas from among total antennas based on a measurement of the received uplink signal, for use in communication with a UE and determines DAS control information about the selected antennas (S102). The DAS control information is UE-specific antenna information that may include information about the number $EN_{tx}$ of downlink transmission antennas and/or the indexes of the antennas. The number of effective transmission antennas, $EN_{tx}$ is defined as the number of antennas that the UE can search for during communication with the eNode B. Although they are located within a cell serviced by the same eNode B, different UEs may be allocated to different numbers of antennas and different antenna indexes according to the locations of the UEs within the cell and the distances between the UEs and the antennas of the eNode B. For example, when a plurality of physical antennas use the same pilot pattern, a signal is transmitted from a single antenna from the standpoint of a UE. Therefore, the number of effective transmission antennas, $EN_{tx}$ is 1 for the UE. That is, the DAS control information is independent for the UE and may be changed in real time according to at least one of the location of the UE and a frequency band used by the UE.

The eNode B transmits the DAS control information determined in step S102 to the UE on a dedicated control channel (S103). The eNode B may transmit the DAS control information to the UE, periodically or only when needed such as upon occurrence of an event. Unlike the illustrated case of FIG. 5, the UE may measure a downlink signal received from the eNode B and derive information about specific antennas effective to the UE. If the UE-specific effective antenna information is same between the BS and the UE, the step of transmitting the DAS control information (S103) may be omitted.

Subsequently, the BS configures a precoder by selecting a precoding matrix corresponding to the effective antennas specific to the UE from a pre-stored DAS codebook based on the DAS control information (S104). The DAS codebook may include DAS precoding matrices constructed based on precoding matrices selected from a conventional CAS codebook and precoding matrices corresponding to 3, 5, 7, 9, and more antennas. The eNode B transmits a signal precoded with the precoding matrix selected from the codebook to the UE (S105).

Then the UE may select a precoding matrix corresponding to the UE-specific effective antenna information included in the control information from a DAS codebook pre-stored based on the DAS control information received in step S103 according to the embodiment of the present invention and may process the received signal using the selected precoding matrix (S105). Specifically, the UE may derive information about the precoding matrix used for the eNode B to precode the signal from the received control information, select the precoding matrix from the pre-stored DAS codebook, and process the received signal by multiplying the received signal by the Hermitian matrix of the precoding matrix.

In this manner, when a BS and a UE share information about the number of UE-specific effective antennas and/or antenna indexes in a DAS according to the embodiment of the present invention, the UE may use a precoding matrix having only rows or columns corresponding to the UE-specific antennas. Therefore, the dimensions of precoding matrices can be reduced without the need for setting 0s in the elements of rows or columns corresponding to BS antennas that the BS has not allocated to the UE. That is, the DAS codebook may be constructed by excluding antenna selective precoding matrices from a plurality of precoding matrices generated according to the above-described embodiment of the present invention. Therefore, the size of the codebook can be reduced by as much as the number of excluded matrices.

However, if antenna information is not shared between a UE and a BS as in the case where the BS does not transmit control information including UE-specific effective antenna information to the UE in FIG. 5, signals can be transmitted and received using an antenna selective precoding matrix.

Figure 6:
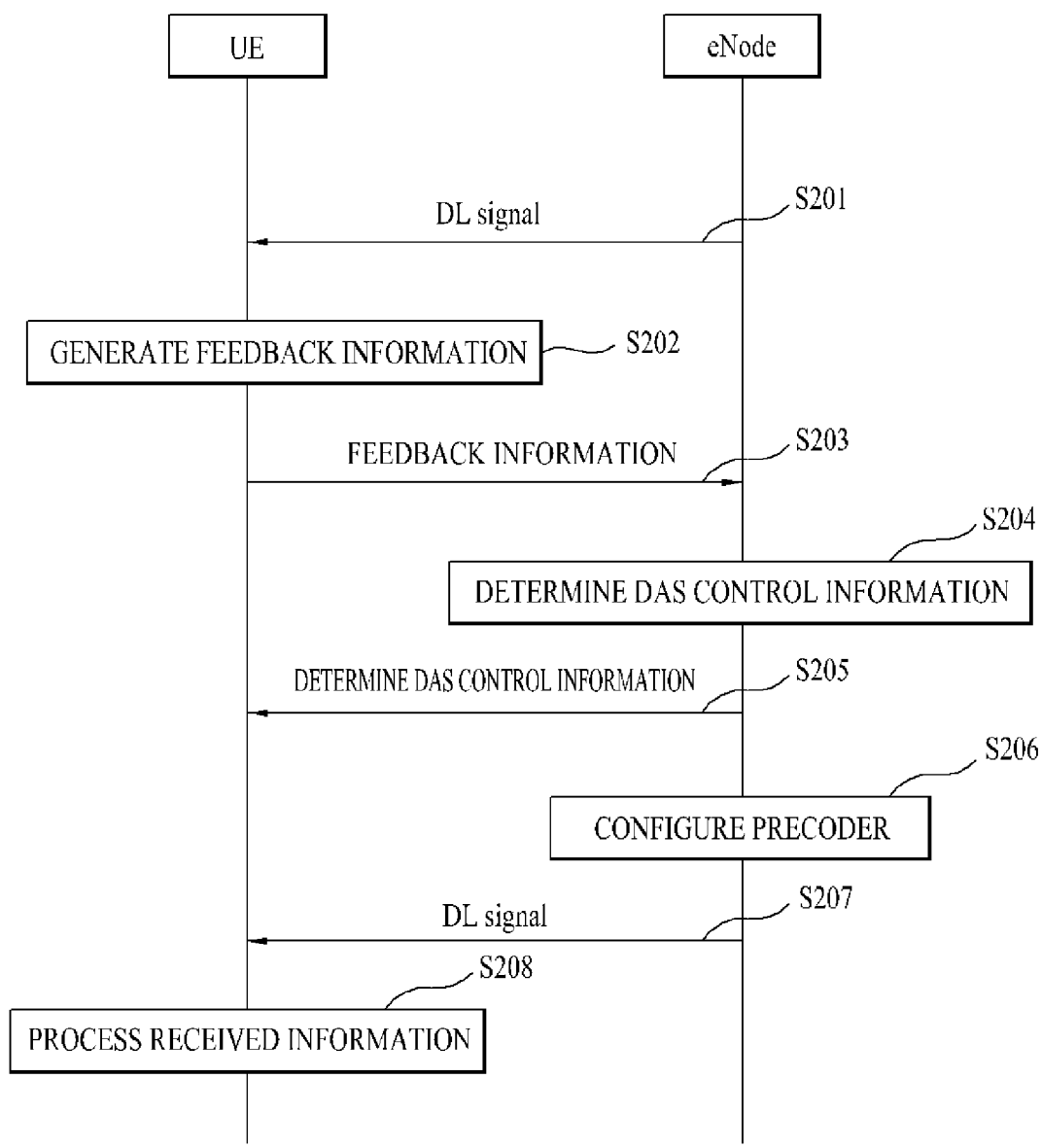
FIG. 6 is a diagram illustrating a signal flow for another exemplary operation for transmitting a signal using a precoding matrix in the DAS according to the embodiment of the present invention.

FIG. 6 is a diagram illustrating a signal flow for another exemplary operation for transmitting a signal using a precoding matrix in the DAS according to the embodiment of the present invention.

Referring to FIG. 6, a UE that is to communicate with an eNode B receives a downlink signal from the eNode B (S201) and generates feedback information including information about BS antennas that the UE can detect based on a measurement of the received downlink signal (S202). The feedback antenna information includes information about the number $EN_{fx}$ of effective antennas detectable by the UE and/or antenna indexes. As described before, when the eNode B transmits a signal in the same pattern through a plurality of antennas, the UE may regard the signal as transmitted through a single antenna. In this case, the number of effective antennas may be 1. The UE transmits the generated feedback information to the eNode B (S203). The eNode B allocates antenna resources specific to the UE among total antennas of the eNode B based on the received feedback information and determines DAS control information regarding the UE-specific antennas allocated to the UE (S204). That is, the eNode B may allocate antenna resources based on the feedback information received from the UE or antenna resources appropriate for the UE according to the load state of a network instead of the feedback information. As described before in relation to FIG. 5, the DAS control information is independent for the UE and may be changed in real time according to at least one of the location of the UE and a frequency band used by the UE.

The eNode B may transmit the DAS control information including the finally determined number of UE-specific antennas and/or antenna indexes to the UE on a dedicated control channel, periodically or only when needed as upon occurrence of an event (S205). If the eNode B allocates antenna resources to the UE based on the feedback information received from the UE, which implies that antenna resource allocation information is shared between the eNode B and the UE, the step of transmitting the DAS control information (S205) may be omitted. In another example, if allocation of antenna resources based on network load state or channel state instead of the feedback information does not lead to a big difference in performance, step S205 may be omitted.

After transmitting the DAS control information, the eNode B configures a precoder by selecting a precoding matrix corresponding to the UE-specific antennas specified in the DAS code information from a DAS codebook created according to the above-described embodiment of the present invention (S206) and transmits a signal precoded with the precoding matrix to the UE (S207).

As described before, in the case where a UE feeds back information about effective antennas to an eNode B and thus antenna information is shared between the eNode B and the UE, a precoding matrix having only elements corresponding to the effective antennas specific to the UE is sufficient for the UE. Therefore, antenna selective precoding matrices may be excluded from the DAS code book.

However, if the effective antenna information that the UE feeds back to the eNode B is different from information about antennas that the eNode B allocates to the UE, for communication and the eNode B does not transmit DAS control information including information about a finally determined number of UE-specific effective antennas and/or antenna indexes to the UE, a codebook may include antenna selective precoding matrices.

In this manner, precoding matrices may be defined in various manners to construct a codebook. The above embodiments of the present invention consider a codebook in which the sum power of each column in a precoding matrix is constantly 1. Depending on the definition of a codebook, the sum power of each column in a precoding matrix may not be 1 or may be changed according to $N_{fx}$ and a rank. Such codebooks may be obtained by scaling the precoding matrices of a codebook according to an embodiment of the present invention with a specific value. Therefore, codebooks designed according to the embodiments of the present invention include any codebook created by scaling precoding matrices with any value.

Precoding matrices suitable for a DAS according to the embodiments of the present invention may be designed into a single codebook which is included in a conventional CAS codebook, or may be formed into a DAS codebook separated from the CAS codebook so that the DAS codebook can be used, when a BS and a UE determine whether they belong to a CAS or a DAS. In the case where the DAS codebook and the CAS codebook are separately formed, information indicating whether the BS and the UE belong to a DAS or a CAS may be signaled to a plurality of UEs through broadcast information on a PBCH in LTE/LTE-A or an SFH in IEEE 802.16. Or, if a CAS codebook or a DAS codebook is preset for each cell in case a UE is moving, when the UE is synchronized to a specific cell, it may download a codebook suitable for the specific cell and use the codebook.

A UE and a BS (FBS or MBS) according to another embodiment of the present invention, which can perform the above-described embodiments of the present invention in a DAS will be described below.

The UE may operate as a transmitter on uplink and as a receiver on downlink. The BS may operate as a receiver on uplink and as a transmitter on downlink. That is, each of the UE and the BS may include a transmitter and a receiver, for transmission and reception of information and data.

Each of the transmitter and the receiver may include a processor, a module, a part, and/or means for implementing the embodiments of the present invention. Especially, the transmitter and the receiver may include a module (means) for encrypting a message, a module for decrypting an encrypted message, and an antenna for transmitting and receiving a message. An example of the transmitter and the receiver will be described with reference to FIG. 7.

Figure 7:
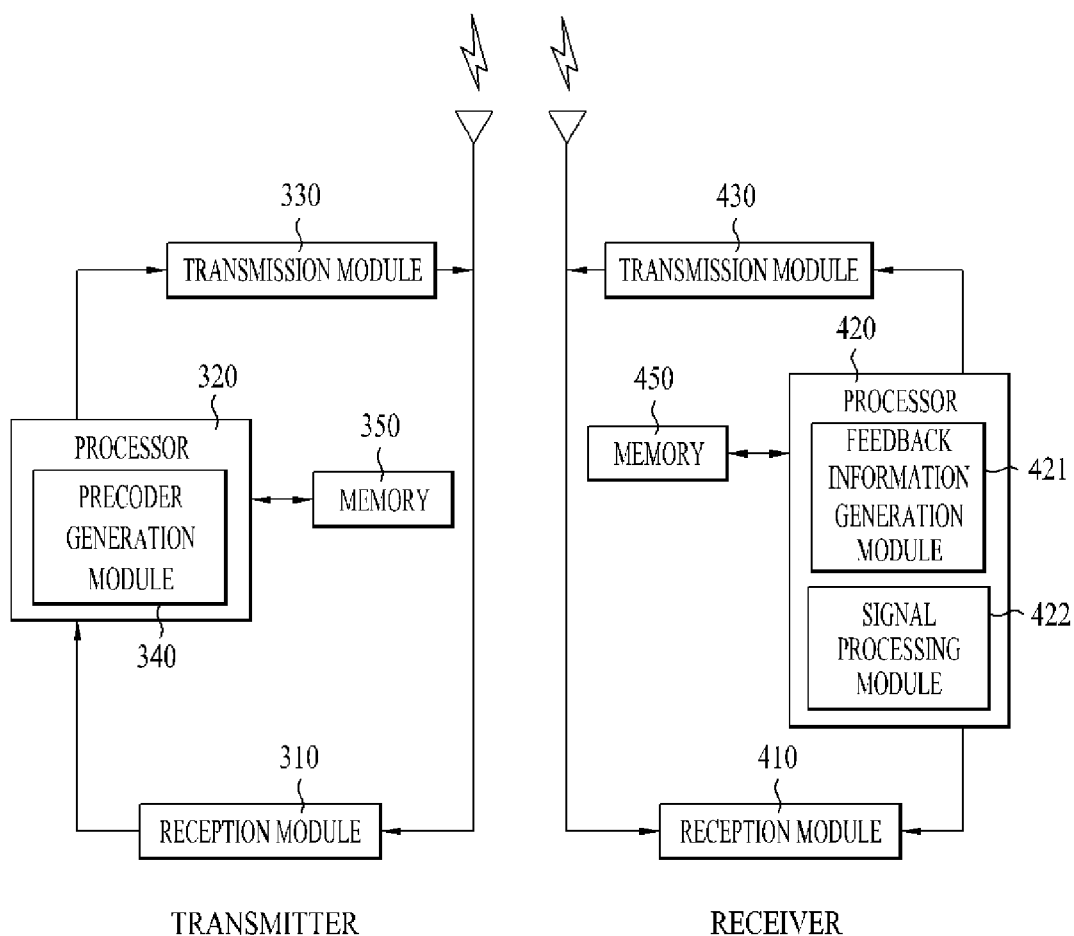
FIG. 7 is a block diagram of a User Equipment (UE) and a Base Station (BS) (FBS or MBS) that can implement the above embodiments of the present invention, according to an embodiment of the present invention.

FIG. 7 is a block diagram of a UE and a BS (FBS or MBS) that can implement the above embodiments of the present invention, according to an embodiment of the present invention.

Referring to FIG. 7, the structure of the transmitter is illustrated on the left side and the structure of the receiver is illustrated on the right side. To describe the foregoing embodiments of the present invention, the transmitter is taken as an example of a BS belonging to a DAS and the receiver is taken as an example of a UE within a cell serviced by the BS. Each of the transmitter and the receiver may include an antenna 300 or 400, a reception module 310 or 410, a processor 320 or 420, a transmission module 330 or 430, and a memory 350 or 450. Each component may perform a corresponding function. Now a detailed description will be given of the components.

The antennas 300 and 400 include reception antennas for receiving an external wireless signal and outputting the received wireless signal to the reception modules 310 and 410 and transmission antennas for transmitting signals generated from the transmission modules 330 and 430 to the outside. If MIMO is supported, two or more antennas 300 and 400 may be provided. In the DAS, a specific antenna or antenna group may be selected from total BS antennas according to channel state, the location of the UE, and the distance between the BS and the UE during communication between the transmitter and the receiver. Therefore, the antenna 300 of the transmitter may be at least one antenna selected from total antennas connected to the BS, for communication with the receiver. The selected antenna may be changed according to a change in the location of the receiver, etc.

Each of the reception modules 310 and 410 may recover original data by decoding and demodulating a wireless signal received through an antenna and output the original data to the processor 320 or 420. A reception module and an antenna may collectively form a receiver for receiving a wireless signal, rather than they are configured separately.

The processor 320 or 420 generally provides overall control to the transmitter or the receiver. Especially, the processor 320 or 420 may perform a control function for performing the above-described embodiments of the present invention, a Medium Access Control (MAC) frame conversion control function according to service characteristics and a propagation environment, a handover function, an authentication and encryption function, etc.

The transmission modules 330 and 430 may encode and modulate data scheduled by the processors 320 and 420 for transmission in a predetermined coding and modulation scheme and output the modulated signal to the antennas. While the transmission modules and the antennas are shown in FIG. 7 as separately configured, they may collectively form transmitters for transmitting a wireless signal.

The memories 350 and 450 may store programs for processing and controlling in the processors 320 and 430 and temporarily store input/output data (a UL grant, system information, an STID, an FID, an action time, etc. received from the BS in case of the UE). In addition, the memories 350 and 450 may include at least one type of storage media including a flash memory type, a hard disk type, a multimedia card micro type, a card-type memory (e.g. an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The memories 350 and 450 store a codebook which is a set of precoding matrices. The codebook may be a DAS codebook constructed according to an embodiment of the present invention or a DAS-CAS integrated codebook including DAS precoding matrices and precoding matrices available to a conventional CAS. The DAS codebook is designed to be used in the DAS according to the embodiment of the present invention. The DAS codebook may include antenna selective precoding matrices including information about BS antennas that are selected according to the location of a UE in a cell, or only precoding matrices corresponding to specific effective antennas allocated to a corresponding UE during wireless communication.

The processor 320 of the transmitter provides overall control to the BS. The processor 320 may include a precoder generation module 340 for generating a precoder that satisfies optimum performance in the BS.

The processor 320 measures a channel state using an uplink signal received through the transmission module 330 of the receiver and determines DAS control information including a channel state measurement result, information about the number of specific antennas to be used for communication with the receiver, selected from the entire BS antennas 300, and/or antenna index information. The precoder generation module 340 may configure a precoder by selecting a precoding matrix corresponding to the UE-specific antennas from the DAS codebook stored in the memory 350 according to the control information determined by the processor 320. Herein, the processor may control transmission of the DAS control information to the receiver through the transmission module. If the DAS control information is not transmitted to the receiver, the memories 350 and 450 pre-store a codebook including antenna selective precoding matrices.

In addition, the processor 320 may derive information about power ratios allocated to the respective antennas used for communication with the UE from a DAS precoding matrix and may allocate power to antennas 300 uniformly or non-uniformly.

Meanwhile, the receiver of the UE may determine information about effective transmission antennas and transmit the information to the BS.

The processor 420 of the receiver provides overall control to the UE. The processor 420 may include a signal processing module 421 for processing a signal received from the transmitter and a feedback information generation module 422 for generating feedback information.

The signal processing module 421 may select a precoding matrix corresponding to UE-specific effective antennas from a DAS codebook stored in the memory 450 based on DAS control information received from the transmitter through the reception module 410 and may process a received signal using the selected precoding matrix.

When the processor 420 measures a downlink signal received from the transmitter and selects a matrix corresponding to antenna selection information that selects a specific antenna or antenna group with a high channel strength from the DAS codebook, the feedback information generation module 422 may generate feedback information including the signal measurement result or Precoding Matrix Index (PMI) information about the selected precoding matrix. The feedback information may include a power scaling factor or information about the index of a power control matrix based on information about a measurement of a pilot signal received from the transmitter.

Meanwhile, the BS may perform a control function for implementing the foregoing embodiments of the present invention, Orthogonal Frequency Division Multiple Access (OFDMA) packet scheduling, a Time Division Duplex (TDD) packet scheduling and channelization function, a MAC frame conversion control function according to service characteristics and a propagation environment, a high-speed traffic real-time control function, a handover function, an authentication and encryption function, a packet modulation/demodulation function for data transmission, a high-speed packet channel coding function, a real-time modem control function, etc. through at least one of the above-described modules, or may further include means, a module, or a part for performing these functions.

A detailed description of the preferred embodiments of the present invention as set forth herein is provided so that those skilled in the art can achieve and implement the present invention. While the present invention has been described above referring to the preferred embodiments of the present invention, those skilled in the art will understand that many modifications and variations can be made to the present invention within the scope and spirit of the present invention. For example, those skilled in the art may combine components described in the foregoing embodiments of the present invention.

The embodiments described herein are therefore to be considered in all respects as illustrative and not as restrictive and the claims should be construed as encompassing the very broadest range of equivalency.

INDUSTRIAL APPLICABILITY

The present invention is applicable to a wireless communication system and, more particularly, to a BS and a UE in a wireless communication system.

The invention claimed is:

1. A method for a User Equipment (UE) receiving a signal from a Base Station (BS) that has a plurality of antennas spaced from each other by at least a predetermined distance in a Distributed Antenna System (DAS), the method comprising:
receiving control information from the BS on a dedicated control channel, the control information related to a number of UE-specific antennas selected from the plurality of antennas for communication with the UE;
receiving the signal; and
processing the received signal using a precoding matrix selected from a DAS codebook, the precoding matrix corresponding to the number of UE-specific antennas,
wherein the DAS codebook includes precoding matrices corresponding to N antennas, the precoding matrices for the N antennas including precoding matrices for M antennas as an element, and
wherein M<N.

2. The method according to claim 1, wherein the control information is independent for each UE in the DAS.

3. The method according to claim 1, wherein the control information is determined according to at least a location of the UE or a frequency band used by the UE.

4. The method according to claim 1, further comprising:
transmitting an uplink signal to the BS,
wherein the control information is determined according to transmitted uplink signal.

5. The method according to claim 1, further comprising:
receiving a downlink signal from the BS;
determining feedback information using the received downlink signal; and
transmitting the feedback information to the BS,
wherein the control information is determined according to the transmitted feedback information.

6. The method according to claim 1, wherein N is 3, 5, 6, 7 or 9.

7. The method according to claim 1, wherein the DAS codebook further includes precoding matrices configured to allocate different transmission power to each of the plurality of antennas.

8. A method for a Base Station (BS) transmitting a signal to a User Equipment (UE) in a Distributed Antenna System (DAS), the method comprising:
storing a DAS codebook;
determining control information related to a number of UE-specific antennas selected for communication with the UE from a plurality of antennas in the BS that are spaced from each other by at least a predetermined distance;
transmitting the control information to the UE on a dedicated control channel;
selecting a precoding matrix from the stored DAS codebook, the precodinq matrix corresponding to the number of UE-specific antennas; and
transmitting the signal to the UE using the selected precoding matrix,
wherein the DAS codebook includes precoding matrices corresponding to N antennas, the precoding matrices for the N antennas including precoding matrices for M antennas as an element, and
wherein M<N.

9. The method according to claim 8, wherein the control information is independent for each UE in the DAS.

10. The method according to claim 8, wherein the control information is determined according to at least a location of the UE or a frequency band used by the UE.

11. The method according to claim 8, wherein the control information is determined using an uplink signal received from the UE.

12. The method according to claim 8, further comprising:
transmitting a downlink signal to the UE;
receiving feedback information from the UE, the feedback information determined using the transmitted downlink signal; and
determining the control information according to the received feedback information.

13. The method according to claim 8, wherein N is 3, 5, 6, 7 or 9.

14. The method according to claim 8, wherein the DAS codebook further includes a precoding matrix configured to allocate different transmission power to each of the plurality of antennas.

15. A User Equipment (UE) receiving a signal from a Base Station (BS) having a plurality of antennas spaced from each other by at least a predetermined distance in a Distributed Antenna System (DAS), the UE comprising:
- a reception module for receiving control information from the BS on a dedicated control channel, the control information related to a number of UE-specific antennas selected from the plurality of antennas for communication with the UE and for receiving the signal;
- a memory for storing a DAS codebook; and
- a processor for selecting a precoding matrix from the stored DAS codebook, the precoding matrix corresponding to the number of UE-specific antennas and for processing the received signal using the selected precoding matrix,
- wherein the DAS codebook includes precoding matrices corresponding to N antennas, the precoding matrices for the N antennas including precoding matrices for M antennas as an element, and
- wherein M<N.

16. The UE according to claim 15, further comprising a transmission module for transmitting signals, wherein:
- the processor is further for:
  - controlling the reception module to receive a downlink signal from the BS;
  - determining feedback information using the received downlink signal; and
  - controlling the transmission module to transmit the feedback information to the BS; and
- the control information is determined according to the transmitted feedback information.

17. A Base Station (BS) transmitting a signal to a User Equipment (UE) in a Distributed Antenna System (DAS), the BS comprising:
- a memory for storing a DAS codebook;
- a transmission module for transmitting signals; and
- a processor for:
  - determining control information related to a number of UE-specific antennas selected for communication with the UE from a plurality of antennas in the BS that are spaced from each other by at least a predetermined distance;
  - controlling the transmission module to transmit the control information to the UE on a dedicated control channel;
  - selecting a precoding matrix from the stored DAS codebook, the precoding matrix corresponding to the number of UE-specific antennas; and
  - controlling the transmission module to transmit the signal to the UE using the selected precoding matrix,
- wherein the DAS codebook includes precoding matrices corresponding to N antennas, the precoding matrices for the N antennas including precoding matrices for M antennas as an element, and
- wherein M<N.

18. The BS according to claim 17, wherein the processor is further for determining the control information according to at least a location of the UE or a frequency band used by the UE.

19. The BS according to claim 17, further comprising a reception module for receiving signals,
- wherein the processor is further for determining the control information using an uplink signal received from the UE via the reception module.

20. The BS according to claim 19, wherein the processor further for:
- transmitting a downlink signal to the UE;
- receiving feedback information from the UE via the reception module, the feedback information determined using the transmitted downlink signal; and
- determining the control information according to the received feedback information.

* * * * *